United States Patent
Aust et al.

(10) Patent No.: US 11,251,898 B2
(45) Date of Patent: Feb. 15, 2022

(54) DEVICE AND METHOD FOR THE UNIDIRECTIONAL TRANSMISSION OF DATA

(71) Applicant: SIEMENS MOBILITY GMBH, Munich (DE)

(72) Inventors: Frank Aust, Salzgitter (DE); Matthias Seifert, Buchholz (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/649,629

(22) PCT Filed: Sep. 6, 2018

(86) PCT No.: PCT/EP2018/073985
§ 371 (c)(1),
(2) Date: Mar. 21, 2020

(87) PCT Pub. No.: WO2019/063258
PCT Pub. Date: Apr. 4, 2019

(65) Prior Publication Data
US 2020/0259585 A1 Aug. 13, 2020

(30) Foreign Application Priority Data
Sep. 29, 2017 (DE) .............. 102017217432

(51) Int. Cl.
*H04L 1/00* (2006.01)
*H04L 1/18* (2006.01)
(Continued)

(52) U.S. Cl.
CPC .............. *H04L 1/00* (2013.01); *H04L 1/1848* (2013.01); *H04L 12/66* (2013.01); *H04L 63/02* (2013.01);
(Continued)

(58) Field of Classification Search
None
See application file for complete search history.

(56) References Cited

U.S. PATENT DOCUMENTS 5,703,562 A 12/1997 Nilsen
6,002,882 A * 12/1999 Garde ................. G06F 13/4291
370/439
(Continued)

FOREIGN PATENT DOCUMENTS

EP 0836338 A2 4/1998
RU 139537 U1 4/2014
(Continued)

OTHER PUBLICATIONS

W. Kehe, V. Fei, C. Wenchao, The Technique of Network Diode, The 1st International Conference on Information Science and Engineering, pp. 1924-1926 (Year: 2009).*
(Continued)

*Primary Examiner* — Christopher M Crutchfield
(74) *Attorney, Agent, or Firm* — Laurence A. Greenberg; Werner H. Stemer; Ralph E. Locher

(57) ABSTRACT

A device for unidirectional transmission of data from first to second networks includes a network TAP reading data from a first subscriber of the first network to the first network and outputting read data to a second subscriber of the second network. A testing device for freedom from errors of read data includes a processor testing the read data for freedom from errors and a first digital output for a digital signal. The processor actuates the first digital output depending on the test of the read data such that the digital output outputs a first digital signal depending on the result of the test of the read data to form a feedback channel to the first subscriber by the output first digital signal to indicate the result of the test of
(Continued)

the read data to the first subscriber. A corresponding method, network system and computer program are also provided.

10 Claims, 2 Drawing Sheets

(51) Int. Cl.
*H04L 12/66* (2006.01)
*H04L 29/06* (2006.01)

(52) U.S. Cl.
CPC ...... *H04L 63/12* (2013.01); *H04L 2001/0097* (2013.01)

(56) References Cited

U.S. PATENT DOCUMENTS

| | | | |
|---|---|---|---|
| 6,278,880 B1 | 8/2001 | Sipila et al. | |
| 7,260,833 B1* | 8/2007 | Schaeffer | H04L 63/1441 709/238 |
| 7,675,867 B1* | 3/2010 | Mraz | H04L 63/123 370/254 |
| 8,352,450 B1 | 1/2013 | Mraz et al. | |
| 9,088,558 B2 | 7/2015 | Curry et al. | |
| 10,396,941 B2 | 8/2019 | Khoryaev et al. | |
| 2005/0165939 A1* | 7/2005 | Nikunen | H04L 67/12 709/230 |
| 2006/0098616 A1 | 5/2006 | Kish et al. | |
| 2009/0002150 A1* | 1/2009 | Zilberstein | H04Q 9/00 340/531 |
| 2009/0249154 A1* | 10/2009 | Sasaki | H04L 1/1829 714/748 |
| 2010/0287545 A1* | 11/2010 | Corbefin | H04L 63/08 717/174 |
| 2014/0215609 A1* | 7/2014 | Fukami | H04L 63/1408 726/22 |
| 2018/0375876 A1 | 12/2018 | Blocher et al. | |
| 2020/0412700 A1* | 12/2020 | Dupont | G06F 21/60 |

FOREIGN PATENT DOCUMENTS

| | | |
|---|---|---|
| WO | 2016164084 A1 | 10/2016 |
| WO | 2017021060 A1 | 2/2017 |

OTHER PUBLICATIONS

M. Kang, I Moskowitz and S. Chincheck, The Pump: A Decade of Covert Fun, Proceedings of the 21st Annual Computer Security Applications Conference, pp. 1-7 (Year: 2005).*

* cited by examiner

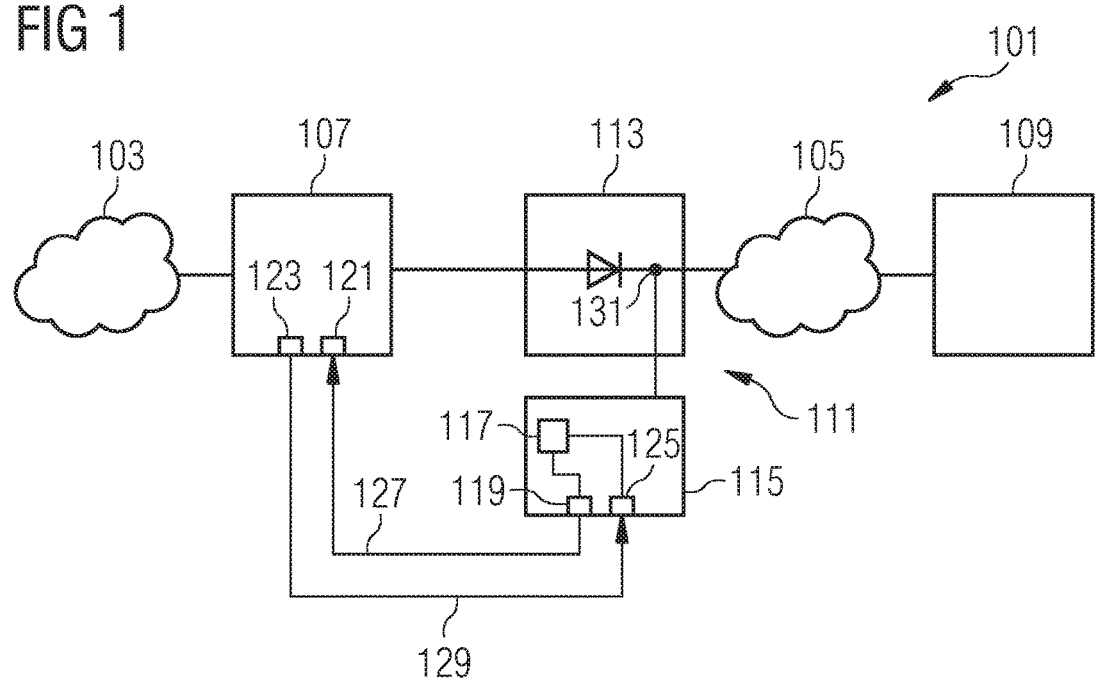
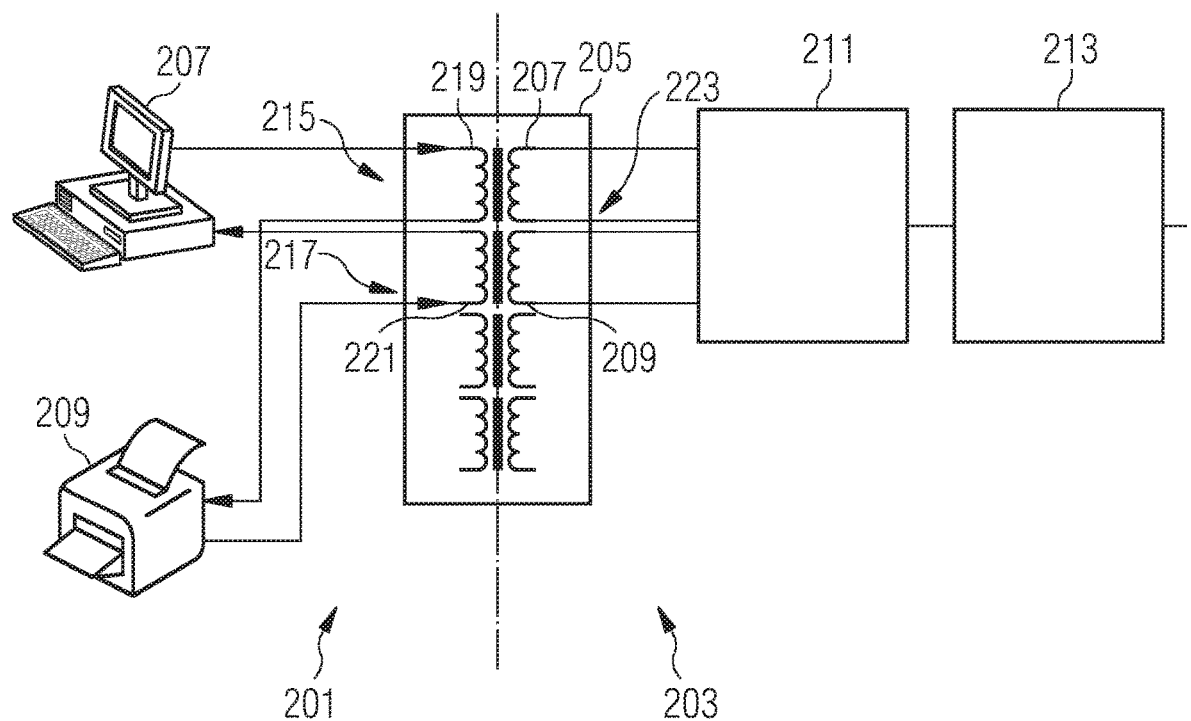

DEVICE AND METHOD FOR THE UNIDIRECTIONAL TRANSMISSION OF DATA

BACKGROUND OF THE INVENTION

Field of the Invention

The invention relates to a device and a method for the unidirectional transmission of data from a first network to a second network. The invention also relates to a network system. Furthermore, the invention relates to a computer program.

The patent specification U.S. Pat. No. 5,703,562 describes a method for transferring data from an insecure computer to a secure computer.

The patent specification U.S. Pat. No. 8,352,450 B1 describes a database update via a unidirectional data connection.

The patent specification U.S. Pat. No. 9,088,558 B2 describes a secure unidirectional interface for a data transfer.

The patent application WO 2017/021060 A1 describes a method and an arrangement for feedback-free transmission of data between networks.

SUMMARY OF THE INVENTION

The object of the invention is to provide an efficient concept for the efficient unidirectional transmission of data from a first network to a second network.

This object is achieved by means of the respective subject of the independent claims. Advantageous embodiments of the invention are the subject of dependent subclaims in each case.

According to one aspect, a device is provided for the unidirectional transmission of data from a first network to a second network, comprising:

a network TAP for reading data which has been transmitted from a first subscriber of the first network to the first network and for outputting the read data to a second subscriber of the second network and a checking device for checking the read data for freedom from errors, wherein the checking device comprises a processor which is designed to check the read data for freedom from errors, wherein the checking device comprises a first digital output for outputting a digital signal, wherein the processor is designed to actuate the first digital output depending on the result of checking for freedom from errors of the read data such that the digital output outputs a first digital signal depending on the result of checking for freedom from errors of the read data so that a feedback channel to the first subscriber can be formed by means of the output first digital signal in order to indicate the result of checking for freedom from errors of the read data to the first subscriber.

According to a further aspect, a method is provided for the unidirectional transmission of data from a first network to a second network using the device for the unidirectional transmission of data from a first network to a second network, comprising the following steps:

reading data which has been transmitted from a first subscriber of the first network to the first network by means of the network TAP, checking the read data for freedom from errors by means of the processor, actuation dependent on the result of checking for freedom from errors of the read data by means of the processor of the first digital output such that the digital output outputs a first digital signal dependent on the result of checking for freedom from errors of the read data so that a feedback channel to the first subscriber can be formed by means of the output first digital signal in order to indicate the result of checking for freedom from errors of the read data to the first subscriber.

According to another aspect, a network system is provided comprising a first network, a second network and the device for the unidirectional transmission of data from a first network to a second network.

According to another aspect, a computer program is provided which comprises program code for carrying out the method for the unidirectional transmission of data from a first network to a second network when the computer program is executed on a computer, for example, on the device for the unidirectional transmission of data from a first network to a second network.

The invention is based on the finding that the above object can be achieved by using a network TAP to transmit data from the first network to the second network. In this case, the property of a network TAP is exploited efficiently and advantageously in that it can read data in a network passively and can output the data via its monitor port or analysis port without a computer connected to the monitor port (also referred to as analysis port) being able to send data via the network TAP to the network. The network TAP thus acts advantageously as a data diode insofar as it can output or outputs the read data only in a unidirectional manner at its monitor port or analysis port respectively.

This means that the network TAP has a monitor port or an analysis port at which the read data is output or can be output. The second network can be connected or is connected to this monitor port or analysis port. This means, in particular, that the second subscriber of the second network is or can be connected to the monitor port or analysis port respectively. This means, in particular, that the checking device is or can be connected to the monitor port or analysis port.

This advantageously prevents data from the second network from being transmitted or sent via the network TAP to the first network. Thus, the data can only be sent or transmitted from the first network to the second network via the network TAP.

Furthermore, the use of the network TAP has the particular technical advantage that it is invisible in the first or second network and therefore cannot be recognized and attacked by any attacker.

Furthermore, the use of a network TAP has the technical advantage that reading can be carried out almost in real time without a significant time delay compared to, for example, a so-called "application level gateway (ALG)". Although such an application level gateway can also read network traffic, it always generates a considerable time offset and usually changes an originally intended time behavior.

The fact that the checking device comprising the processor is provided results in the technical advantage, in particular, that the read data can be checked efficiently for freedom from errors.

Providing the first digital output has the technical advantage that a feedback channel to the first subscriber can be formed by this means in order to indicate the result of checking for freedom from errors of the read data to the first subscriber.

This thus advantageously has the effect that, despite the solely unidirectional transmission of data from the first network to the second network, it is nevertheless possible to indicate to the first subscriber whether its transmitted data has arrived in the second network without errors.

Thus, for example, optimal protection of a data transfer from the first network to the second network can be brought about in an efficient manner.

In the case of conventional "one-way gateways", because of the unidirectional data connection, the transmitter of data cannot, as a rule, be prompted to retransmit the data until errors are no longer detected because there is usually no feedback function (feedback channel).

For example, if the data is very important and erroneous transmission thereof is not permitted, very important data or entire files may be lost in this way.

As it is not generally possible to predict the duration of a data transmission failure, even multiple transmission of the data is not usually of any use in ensuring that the transmission has been carried out without errors.

For efficient handling of data storage devices or because only limited storage volume is available, data transmitted once is usually deleted at the data source, that is to say, for example, at the transmitter or the first subscriber, after transmission. In the error case described, this data would then be lost.

However, the concept according to the invention indicates to the first subscriber of the first network via the feedback channel whether or not the data has been transmitted free from errors. Thus, in the event of an error, the first subscriber can, for example, resend the data. For example, it is provided that the first subscriber stores the transmitted data until it has been indicated by means of the first digital signal that the transmitted data has arrived free from errors in the second network. Only then, for example, is provision made for the deletion of the transmitted data.

A potential loss of data is thus advantageously avoided.

Indicating to the first subscriber by means of the first digital signal whether the read data is free from errors or erroneous efficiently avoids data being sent from the network TAP to the first network in order to inform the first subscriber whether the read data is free from errors or erroneous. This signaling of the accuracy of data transmission to the data source, that is to say to the first subscriber of the first network, is considered secure as it does not allow any harmful penetration to the first network and a possible type of functional triggering in the first network is or can be limited to precisely defined functions with a defined effect.

Thus, the technical advantage is that an efficient concept for the efficient unidirectional transmission of data from a first network to a second network is provided.

A digital signal within the meaning of the description is, for example, a 1-bit signal or a multi-bit signal.

A digital signal within the meaning of the description is, for example, an electrical signal or an optical signal.

A digital signal within the meaning of the description comprises, for example, an electrical signal and/or an optical signal.

A digital output within the meaning of the description is, for example, an electrical output or an optical output.

A digital output within the meaning of the description comprises, for example, an electrical output and/or an optical output.

A digital input within the meaning of the description is, for example, an electrical input or an optical input.

A digital input within the meaning of the description comprises, for example, an electrical input and/or an optical input.

Data within the meaning of the description comprises, for example, sub-packets, in particular, data transmission sub-packets.

Data within the meaning of the description comprises, for example, one or more data packets and/or one or more data blocks and/or one or more sub-packets and/or one or more checksums.

The first digital signal comprises, for example, checksum feedback and/or the information as to which data packets and/or which data block has been successfully transmitted.

Checksum feedback indicates whether the transmitted checksum of the data corresponds to that checksum determined by means of the processor based on the transmitted data. Thus, for example, the processor determines a checksum based on the transmitted data and compares this to the checksum that is included in the transmitted data in order to check whether the data has been transmitted free from errors.

A network TAP within the meaning of the description establishes a passive access point to a network connection, as a result of which the data signals transmitted via the network connection (in the present case, the data sent by means of the first subscriber) can be read for analysis purposes, for example, and evaluated, for example, in particular checked for freedom from errors (in the present case, the read data is sent or output to the second network, in particular to the second subscriber).

The abbreviation "TAP" stands for "test access port".

A network TAP within the meaning of the description works on the OSI layer 1 (OSI layer 1) and has no MAC address. The network TAP is thus invisible in the first network as well as in the second network.

The network TAP may also be referred to as a passive network TAP insofar as it establishes the passive access point described above.

The network TAP may, for example, also be referred to as an Ethernet TAP.

This means, in particular, that the network TAP reads the data in a purely passive manner, that is to say, it cannot send any data to the first network itself.

The first digital signal is, for example, a logic high or a logic low.

For example, provision is made for the first digital signal to be a logic high if the result of checking the read data for freedom from errors has revealed that the read data is free from errors. For example, provision is made for the first digital signal to be a logic low if the result of checking the read data for freedom from errors has revealed that the read data is erroneous or vice versa.

In one embodiment, the first network has a higher level of integrity than the second network. That is to say, for example, that the first network has or must meet higher security requirements than the second network.

According to one embodiment, it is provided that the checking device comprises a first digital input for receiving a first digital acknowledgement signal of the first subscriber, wherein the processor is designed to control the first digital output on the basis of the received first digital acknowledgement signal in such a way that it ceases the outputting of the first digital signal.

This has the technical advantage, for example, that it is possible to efficiently indicate to the checking device that the first subscriber has received the first digital signal.

This means in particular that the first subscriber has a second digital input which receives the first digital signal. The first digital output of the checking device is thus, for example, connected to the second digital input of the first subscriber. This means that by means of the second digital input the first subscriber receives the first digital signal output by means of the first digital output of the checking device.

This therefore means, for example, that the first subscriber has a second digital output which, in response to receiving the first digital signal by means of the first subscriber, outputs the first digital acknowledgement signal.

Thus, in an advantageous manner, for example, the checking device can efficiently continue checking further read data. Thus, for example, it is no longer necessary to wait for a "time-out".

According to one embodiment, it is provided that a communication interface for sending an error message to a diagnostic system is provided, wherein the processor is designed to check whether the first digital acknowledgement signal has been received within a predetermined time interval after outputting the first digital signal, wherein the processor is designed to control the communication interface in such a way that it sends an error message to the diagnostic system if the first digital acknowledgement signal has not been received within the predetermined time interval after outputting the first digital signal.

This has the technical advantage, for example, that potential errors can be diagnosed efficiently.

The predetermined time interval is, for example, 10 ms maximum, for example, 100 ms maximum, for example, 500 ms maximum, for example, 1 s maximum, for example, 2 s maximum, for example, 3 s maximum.

In another embodiment, it is provided that a network disconnection device is provided for separating the network TAP from the first and/or second network, wherein the processor is designed to control the network disconnection device in such a way that it separates the network TAP from the first and/or second network if the first digital acknowledgement signal has not been received within the predetermined time interval after outputting the first digital signal.

This has the technical advantage, for example, that an efficient separation of the network TAP from the first or second network can be brought about. In this way, an efficient separation of the first and of the second network from one another can be advantageously brought about.

Separation comprises, for example, physical separation, for example, interrupting a data link between the first subscriber and the network TAP or between the second subscriber and the network TAP.

According to one embodiment, the checking device comprises a second digital output for outputting a second digital signal. The processor is, for example, designed to control the second digital output in such a way that the latter outputs the second digital signal.

In another embodiment, it is provided that the processor is designed to control the first digital output and/or a second digital output of the checking device in such a way that it outputs a second digital signal in order to indicate to the first subscriber that it should perform one or more predetermined actions.

This has the technical advantage, for example, that the one or more predetermined actions can be performed efficiently. For example, such predetermined actions comprise one or more file operations. Thus, for example in a network of a higher level of integrity, certain file operations and/or other operations can be triggered in an advantageous manner. Thus, it is therefore advantageously possible for commands to be issued via the digital outputs of the checking device.

This therefore means, for example, that the second digital signal is or can be output via the first digital output. This therefore means, for example, that the second digital signal can be or is output via the second digital output.

For example, it is provided that in each case a (second) digital signal is output both via the first digital output and via the second digital output, in order to indicate to the first subscriber that it should perform one or more predetermined actions.

According to one embodiment, a number of digital signals used in the context of the concept according to the invention is not absolutely limited. That is to say, according to one embodiment, it is provided that a plurality of, for example 8, digital outputs or a plurality of, for example 8, digital inputs are provided. The checking device comprises, for example, a plurality of digital outputs, for example, 8 digital outputs. The checking device comprises, for example, a plurality of digital inputs, for example, 8 digital inputs.

The first subscriber comprises, for example, a plurality of digital outputs, for example, 8 digital outputs. The first subscriber comprises, for example, a plurality of digital inputs, for example, 8 digital inputs.

A digital output of the checking device is, for example, connected to a digital input of the first subscriber.

A digital input of the checking device is, for example, connected to a digital output of the first subscriber.

Communication between the first subscriber and the checking device is thus advantageously brought about via the digital inputs or outputs of the first subscriber or the checking device.

In one embodiment, it is provided that the checking device is integrated in the network TAP.

This has the technical advantage, for example, that a compact structure is made possible.

In another embodiment it is provided that the checking device can be connected or is connected externally to the network TAP.

This has the technical advantage, for example, that a simple exchange of the checking device is made possible.

In one embodiment, provision is made for the first subscriber to be a computer of an actuating mechanism, in particular of an actuating mechanism of a railway operating system.

This has the technical advantage, for example, that data from the actuating mechanism can be transmitted in a secure and unidirectional manner from the actuating mechanism to the second network.

For example, the data sent from the first participant includes diagnostic data of the actuating mechanism. Thus, for example, the technical advantage is that such diagnostic data can be reliably transmitted to the second network. Thus, for example, the second subscriber of the second network can further analyze this diagnostic data.

In one embodiment it is provided that the device is designed for unidirectional transmission or is configured to execute or perform the method for the unidirectional transmission of data.

Technical functionalities of the device result analogously from corresponding technical functionalities of the method and vice versa.

This means, for example, that device features result from corresponding method features and vice versa.

According to one embodiment it is provided that the network is designed to carry out the method for unidirectional transmission of data.

In one embodiment the network system comprises the first subscriber or the second subscriber.

In one embodiment the first network comprises the first subscriber.

In one embodiment the second network comprises the second subscriber.

In one embodiment the first network comprises a third subscriber.

In one embodiment, the first subscriber sends the data to the third subscriber. That is to say, for example, according to this embodiment, the network TAP also reads the data which is sent from the first subscriber to the third subscriber.

For example, according to one embodiment, provision is made for the second subscriber to be a computer of a control center of a railway operating system.

For example, it is provided that the actuating mechanism is part of the railway operating system.

Data in the sense of the description comprises, for example, data blocks or files or data packets or telegrams. Data comprises, for example, diagnostic data. Data comprises, for example, protocol data. Data comprises, for example, data records. Data comprises, for example, status data indicating a status of a route section of the railway operating system. Status data indicates, for example, a signaling status or a switch status of the route section.

In one embodiment of the method, an output by means of the network TAP of the read data to a second subscriber of the second network is provided.

The formulation "respective" includes in particular the formulation "and/or".

The properties, features and advantages of this invention described above and the manner in which they are achieved can be more clearly understood in connection with the following description of the exemplary embodiments which are explained in more detail in connection with the drawings.

BRIEF DESCRIPTION OF THE SEVERAL VIEWS OF THE DRAWING

FIG. 1 A network system,
FIG. 2 A network TAP,
FIG. 3 The network TAP according to FIG. 2 in a further representation and
FIG. 4 A flow diagram of a method for the unidirectional transmission of data from a first network to a second network.

DETAILED DESCRIPTION OF THE INVENTION

Figure 3:
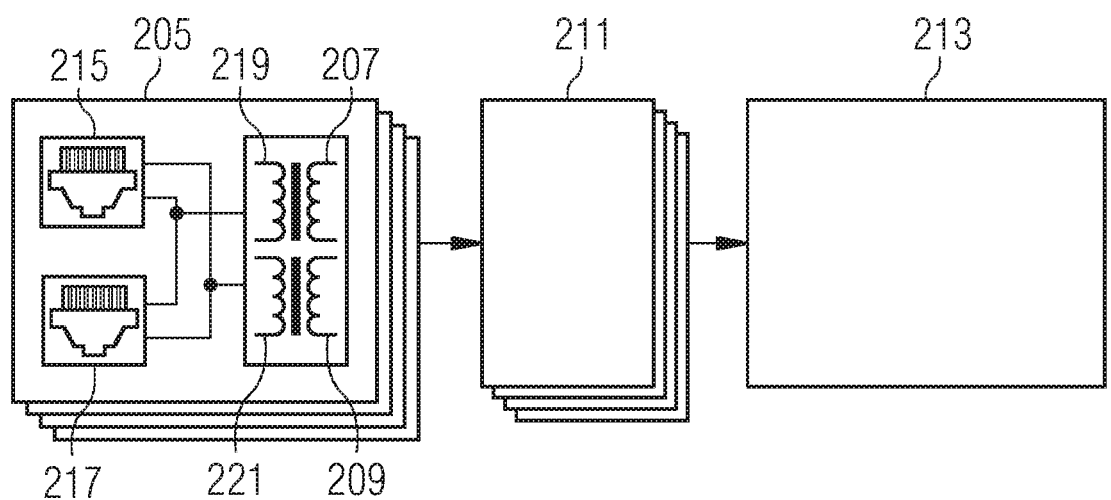

FIG. 1 shows a network system 101.

The network system 101 comprises a first network 103 and a second network 105.

The first network 103 comprises a first subscriber 107.

The second network 105 comprises a second subscriber 109.

The first subscriber 107 is, for example, a computer of an actuating mechanism of a railway operating system.

A device 111 for the unidirectional transmission of data from a first network to a second network is arranged or connected between the first network 103 and the second network 105.

The device 111 comprises a network TAP 113 for reading data which has been sent from a first subscriber of the first network to the first network, and for outputting the read data to a second subscriber of the second network.

The device 111 further comprises a checking device 115 for checking the read data for freedom from errors. The checking device 115 comprises a processor 117 which is designed to check the read data for freedom from errors.

The checking device 115 comprises a first digital output 119 for outputting a digital signal.

The processor 117 is designed, depending on the result of checking the read data for freedom from errors, to control the first digital output 119 in such a way that it outputs a first digital signal which is dependent on the result of checking the read data for freedom from errors so that a feedback channel to the first subscriber can be formed by means of the output first digital signal in order to indicate the result of checking for freedom from errors of the read data to the first subscriber.

An exemplary operation of the device 111 is explained in more detail hereinafter:

The first subscriber 107 sends data to the first network 103, for example, to a third subscriber of the first network 103 which is not shown. This data is read by means of the network TAP 113. The read data is checked for freedom from errors by means of the processor 117 of the checking device 115.

If checking has indicated that the read data is free from errors, the processor 117 controls the first digital output 119 in such a way that it outputs a logic high.

The checking device 115 further comprises a first digital input 125 for receiving a first digital acknowledgement signal from the first subscriber.

The first digital output 119 is connected to a second digital input 121 of the first subscriber 107. That is to say, by means of the second digital input 121 the first subscriber 107 receives the first digital signal which has been output by means of the first digital output 119 of the checking device 115. A feedback channel 127 from the checking device 115 to the first subscriber 107 is thus formed via the connection between the first digital output 119 and the second digital input 121.

If the read data is free from errors, the first subscriber 107 thus receives, for example, a logic high by means of its second digital input 121. This means that if the read data is free from errors, a logic high signal is applied at the second digital input 121.

The first subscriber 107 further comprises a second digital output 123 for outputting the first digital acknowledgement signal. The second digital output 123 of the first subscriber 107 is connected to the first digital input 125 of the checking device 115. A communication channel 129 is therefore formed between the first subscriber 107 and the checking device 115 via the connection between the second digital output 123 and the first digital input 125.

The checking device 115 thus receives the acknowledgement signal by means of the first digital input 125.

The processor 117 controls the first digital output 119 in response to receiving the digital acknowledgement signal such that it ceases outputting the first digital signal, for example, outputting the logic high signal.

The read data is output to the second subscriber 109 of the second network 105 by means of the network TAP 113.

For this purpose, the second subscriber 109 or the second network 105 is connected to an analysis port or monitoring port 131 of the network TAP 113.

In this way, it is thus efficiently brought about that data can only be transmitted from the first network 103 to the second network 105 in a unidirectional manner.

FIG. 2 shows a first network 201 and a second network 203. The first network 201 has, for example, a higher level of integrity than the second network 203.

A network TAP 205 is connected between the first network 201 and the second network 203.

The first network 201 comprises a first subscriber 207, for example, a computer.

The second network 203 comprises a second subscriber, not shown here.

The first network 201 comprises a third subscriber 209, for example, a printer.

The network TAP 205 comprises a first communication interface 215 and a second communication interface 217, for example, in each case an Ethernet communication interface.

The first subscriber 207 is connected, for example, to the first communication interface 215, for example, by means of an Ethernet cable.

The third communication subscriber 209 is connected, for example, to the second communication interface 217, for example, by means of an Ethernet cable.

The two communication interfaces 215, 217 are connected to one another in such a way that a bidirectional connection is formed between the first subscriber 207 and the second subscriber 209.

Thus, in particular, a first data connection 219 is formed between the first subscriber 207 and the third subscriber 209, via which data is sent from the first subscriber 207 to the third subscriber 209.

Thus, for example, a second data connection 221 is formed via which data is sent from the third subscriber 209 to the first subscriber 207.

The network TAP 205 comprises a first coil 207 for inductive reading of the data sent from the first subscriber 207 to the third subscriber 209 via the first data connection 219.

The network TAP 205 further comprises a second coil 209 for reading data which is sent from the third subscriber 209 to the first subscriber 207 via the second data connection 221.

The network TAP 205 comprises a third communication interface 223 (monitoring port) via which the data read out is output to a physical interface (also referred to as PHY) 211. The physical interface 211 forwards the read data to a checking device 213 for checking the read data for freedom from errors.

The checking device 213 is connected to the second subscriber of the second network 203, which is not shown.

This procedure efficiently ensures that data sent from the second subscriber to the second network 203 is not transmitted via the network TAP 205 to the first network 201.

FIG. 3 shows the network TAP 205 according to FIG. 2 in a further representation. In the present case, the two communication interfaces 215, 217 are, for example, designed as an RJ45 socket.

The network TAP 205 is designed, for example, as a quadruple Ethernet TAP (4×Ethernet TAP).

The physical interface 211 is, for example, designed as an eightfold physical interface (8×Ethernet PHY).

It is to be noted at this point that the elements shown in FIGS. 1 to 3, in particular the device 111 or the network TAP 205, are each disclosed individually as well as detached from the other elements, in particular detached from the network system 101.

Figure 4:
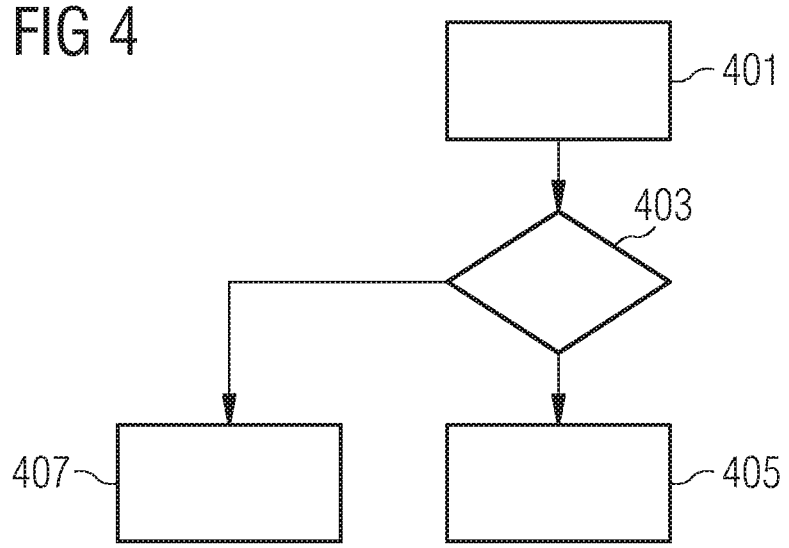

FIG. 4 shows a flow chart of a method for the unidirectional transmission of data from a first network to a second network.

The method provides for the use of a device for the unidirectional transmission of data from a first network to a second network, for example, the device 111 according to FIG. 1.

The method comprises a step of reading 401 by means of the network TAP of data sent from a first subscriber of the first network to the first network.

The method comprises checking 403 the read data for freedom from errors by means of the processor.

If the data is free from errors, the processor controls the first digital output according to a step 405 such that it outputs a logic high.

Insofar as the data is erroneous, the processor controls the first digital output according to a step 407 such that it outputs a logic low.

Thus, a result of checking the read data for freedom from errors based on digital signals can be indicated to the first subscriber. In this respect, a feedback channel is formed to the first subscriber.

However, it is not possible to transmit data from the second network to the first network via this feedback channel.

The network TAP thus advantageously acts as a data diode.

In summary, the concept according to the invention is based inter alia on the idea of using or employing a network TAP for the transmission of data, for example, data blocks or files, from a first network to a second network. For example, the first network has a higher level of integrity than the second network.

The concept according to the invention further comprises, in particular, the idea of making it possible to indicate the accuracy of data transmission to the data source, that is to say, to the first subscriber, via a digital output. This type of return indication is considered to be secure as it does not allow any harmful intrusion into the secure network and a type of function release in the network with the higher level of integrity is limited to precisely defined functions with a defined effect.

For example, it is provided that the data or data blocks or files transmitted by the first subscriber are provided with an integrity safeguard, for example, a checksum. After the arrival or receipt of such data, for example a data record, a data block or a file, on the side of the network TAP with lower integrity, the content is checked for freedom from errors by the checking device. The checking device shows the result of the checking of the side with the higher level of integrity, that is to say the first subscriber, by activating the first digital output. According to one embodiment of the checking device, by activating a second digital output of the first subscriber, the first subscriber then acknowledges that the message has been understood and that the next data record or data block or the next file will thus be sent. According to one embodiment, it is then provided that the first digital output of the checking device is deactivated again which, according to a further embodiment, results in the deactivation of the second digital output of the first subscriber.

As a result of the sequence described above: data transmission-data acknowledgement, according to one embodiment the acknowledgement signals are only considered valid when they are detected at a predetermined time or within a predetermined time interval in the course of this process. If, for example, the acknowledgement signals do not arrive at the correct time or within the predetermined time interval or in an incorrect sequence, they are ignored according to one embodiment or the connection is deactivated according to one embodiment, for example the connection is disconnected by means of a network disconnection device.

According to one embodiment, such a fault or such an error is reported to a diagnostic system.

According to one embodiment, it is provided that the checking device comprises one or more further digital outputs in order to indicate to the first subscriber via the application of specific digital signals that said first subscriber is to carry out one or more predetermined actions, for example, file operations or other operations in the first network.

For example, according to one embodiment, the checking device comprises one or more further digital inputs so that it can receive acknowledgement signals from the first subscriber corresponding to these command signals (the digital signals of the further digital outputs).

Thus, in an advantageous manner, communication between the checking device and the first subscriber is made possible using digital signals. For example, it is thus advantageously provided that the checking device can control the first subscriber by applying corresponding digital signals at its digital outputs.

Nevertheless, it is ensured on the basis of the concept according to the invention that no data can be transmitted from the second network via the network TAP and also via the checking device to the first network.

Although the invention has been illustrated and described in detail by the preferred exemplary embodiments, the invention is not limited by the disclosed examples and other variations may be derived therefrom by a person skilled in the art without departing from the scope of the invention.

The invention claimed is:

1. A device for the unidirectional transmission of data from a first network to a second network, the device comprising:
   a network TAP configured for reading data having been transmitted from a first subscriber of the first network to the first network and for outputting the read data to a second subscriber of the second network; and
   a checking device configured for checking the read data for freedom from errors, said checking device including a processor configured to check the read data for freedom from errors and said checking device including a first digital output for outputting a digital signal;
   said processor configured to actuate said first digital output depending on a result of checking for freedom from errors of the read data, causing the digital output to output a first digital signal depending on the result of checking for freedom from errors of the read data, permitting a feedback channel to the first subscriber to be formed by the output first digital signal in order to indicate the result of checking for freedom from errors of the read data to the first subscriber;
   said checking device including a first digital input configured for receiving a first digital acknowledgement signal of the first subscriber; and
   said processor is configured to actuate said first digital output based on the received first digital acknowledgement signal such that the digital output ends the output of the first digital signal.

2. The device according to claim 1, which further comprises a communication interface for sending a fault message to a diagnostic system, said processor configured to check whether the first digital acknowledgement signal has been received within a predetermined time interval after outputting the first digital signal, and said processor configured to actuate the communication interface to cause said communication interface to send a fault message to the diagnostic system if the first digital acknowledgement signal has not been received within the predetermined time interval after outputting the first digital signal.

3. The device according to claim 2, which further comprises a network disconnection device for disconnecting said network TAP from at least one of the first or second network, said processor configured to actuate said network disconnection device causing said network disconnection device to disconnect said network TAP from at least one of the first or second network when the first digital acknowledgement signal has not been received within the predetermined time interval after outputting the first digital signal.

4. The device according to claim 1, wherein said processor is configured to actuate at least one of said first digital output or a second digital output of said checking device, causing said checking device to output a second digital signal in order to indicate to the first subscriber that the first subscriber should perform one or more predetermined actions.

5. The device according to claim 1, wherein said checking device is integrated in said network TAP.

6. The device according to claim 1, wherein said checking device is configured to be connected externally to said network TAP.

7. The device according to claim 1, wherein the first subscriber is a computer of an actuating mechanism.

8. A method for the unidirectional transmission of data from a first network to a second network, the method comprising the following steps:
   providing a device according to claim 1;
   reading data having been sent from a first subscriber of the first network to the first network by the network TAP;
   using the processor to check the read data for freedom from errors; and
   using the processor to actuate the first digital output dependent on a result of checking for freedom from errors of the read data, causing the digital output to output a first digital signal depending on the result of checking for freedom from errors of the read data, permitting a feedback channel to the first subscriber to be formed by the output first digital signal in order to indicate the result of checking for freedom from errors of the read data to the first subscriber.

9. A network system, comprising a first network, a second network and the device according to claim 1, wherein the first subscriber is configured to output the first digital acknowledgment signal in response to receiving the first digital signal output by said first digital output of said checking device.

10. A non-transitory computer readable medium, comprising program code for performing the method according to claim 8 when the computer program is executed on a computer.

* * * * *